United States Patent Office 3,305,946
Patented Feb. 28, 1967

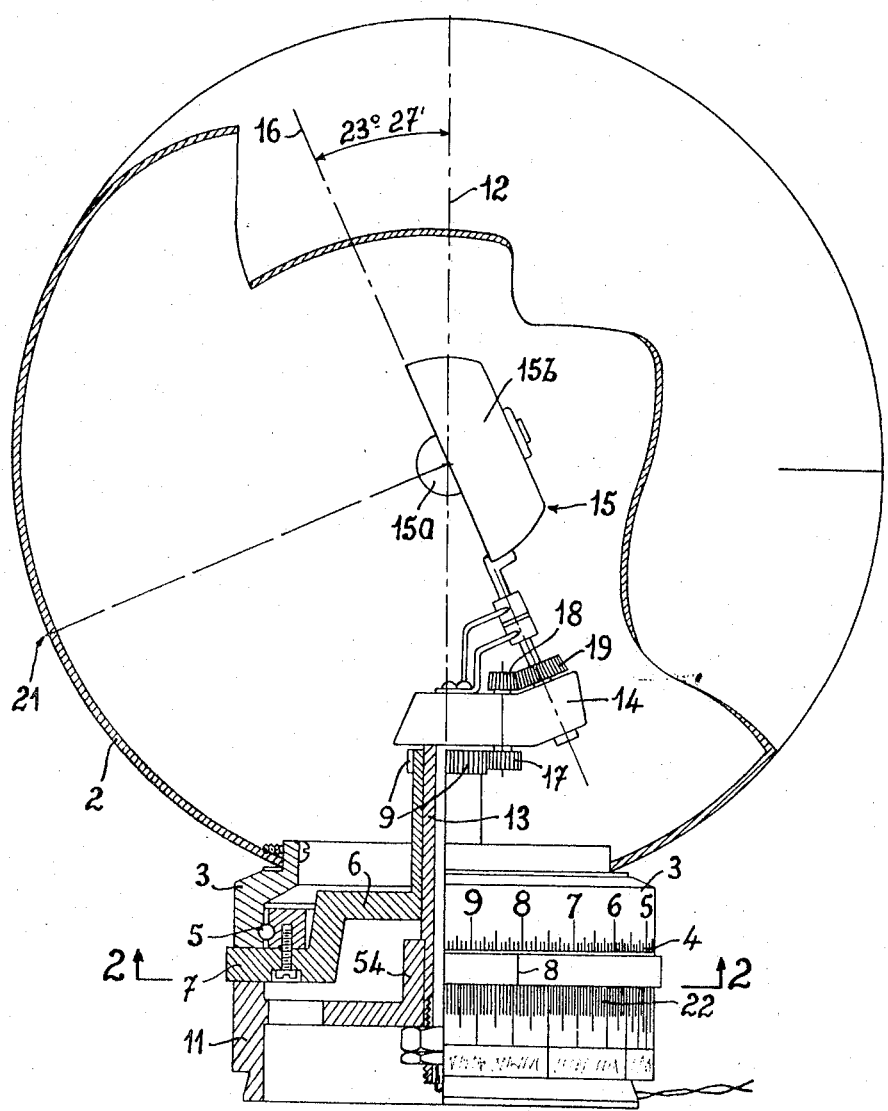

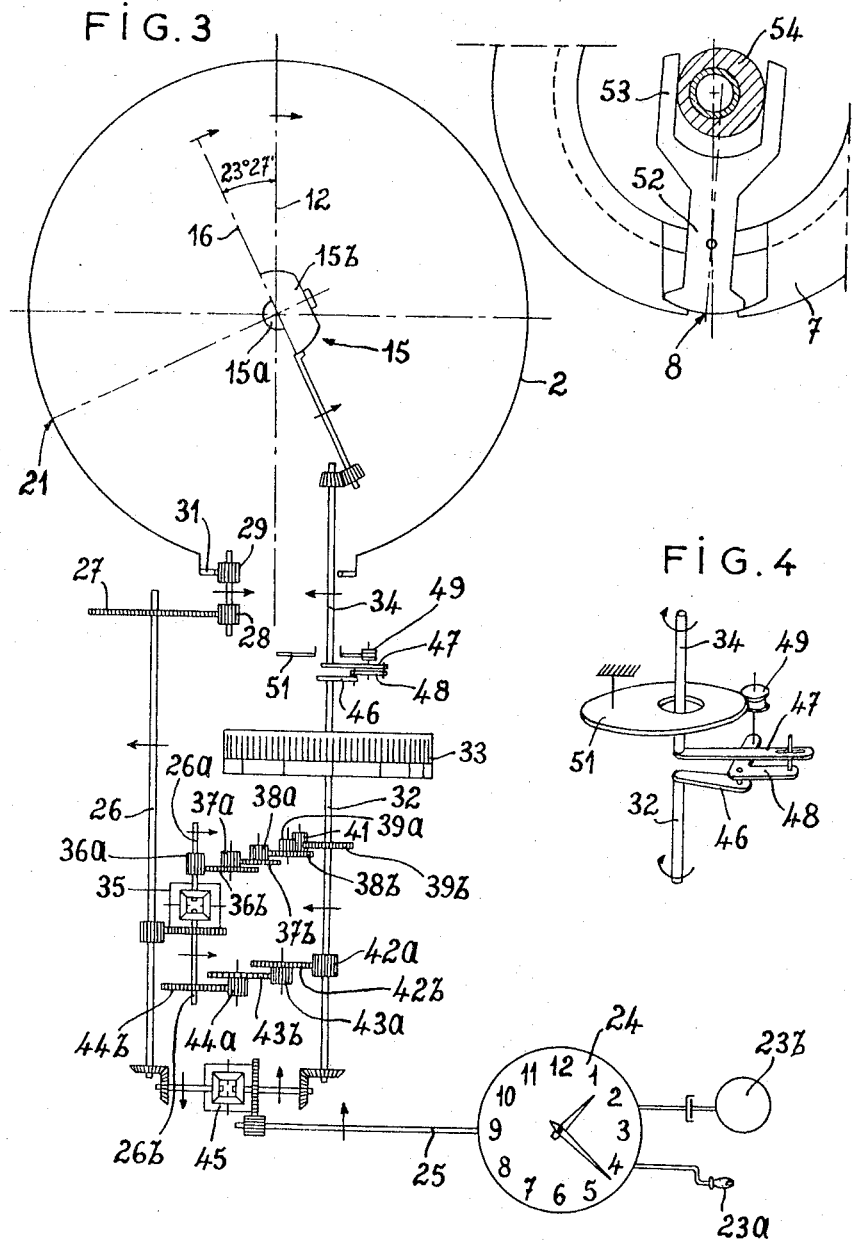

3,305,946
APPARATUS SIMULATING THE ILLUMINATION OF EARTH BY THE SUN AT ANY TIME AND DATE
Tristan du Gardin, 42 Rue Massena, Lyons, France
Filed Dec. 1, 1965, Ser. No. 510,745
Claims priority, application France, Dec. 2, 1964, 45,370, Patent 1,425,541
5 Claims. (Cl. 35—46)

It is a well-known fact that Earth revolves round its axis with reference to the Sun so as to accomplish a revolution in 24 hours round its polar axis in an anti-clockwise direction from West to East.

During one year, that is exactly during 365.2422 days, Earth executes furthermore in an anticlockwise direction, one revolution round the Sun in the plane of the ecliptic along a slightly elliptic path one of the foci of which is occupied by the Sun.

The polar axis of Earth slopes by 23°27' with reference to a perpendicular to the plane of the ecliptic and remains always parallel to the same direction. It is not necessary to take into account the precession of the equinoxes if it is not desired to locate accurately the solar system with reference to the stars.

My invention covers an apparatus simulating the actual daylight illumination of Earth as a function of time and date. Said apparatus includes the following parts:

A translucent surface of revolution forming a terrestrial globe and carrying the usual geographical data such as the continents, the countries and the main cities, the meridian and parallel lines including the equator, the polar circles, the tropics and the like, An optical system simulating the Sun, located inside said globe and illuminating one-half of the latter along one side of a great circle and showing furthermore by a more illuminated or darker spot the trace of the axis of the great circle on the surface of said globe, An hour dial or drum and a calendar dial or drum, A mechanism controlled by hand or by a clockwork adapted to interconnect the above parts and locating the optical system with reference to the globe so as to simulate the actual illumination of the Earth by the Sun at any desired hour and date.

Thus, mere inspection of the apparatus shows at the day and date considered, the time being given as the mean local time:

The actual illumination of the Earth,
The cities and areas where the Sun is rising or setting,
The location of the point of the Earth where the Sun is at its zenith,
The apparent solar time,
The hand operated shifting of the time and calendar dials towards the past or towards the future allows ascertaining:
The time of the rising or setting of the Sun at any point of the Earth at any selected day,
The duration of day or night at such a point and such a date starting from said time of rising or setting, including the dates of the beginning and of the end of the polar night at various points of the arctic areas,
The time and day of the passage of the Sun at the zenith of a point in the tropical areas,
The solstices and the equinoxes.

This apparatus may be executed in various different maners. According to one embodiment, the globe rigid with the time scale is adapted to pivot round its polar axis while the optical system is carried by a shaft sloping at 23°27' with reference to the polar axis and revolving in unison with the calendar drum or with the index co-operating with the latter, the arrangement being such that the globe may execute one revolution in twenty-three hours fifty-six minutes and four seconds, that is 366.2422 revolutions per year while the optical system executes one revolution per year in the same direction as the globe.

Said embodiment which does not take into account the precession of the equinoxes and the like very small ancillary movements of the Earth, shows with an excellent approximation, the movement of the Earth with reference to the stars and the movement of the Sun along the zodiac.

The apparatus provides thus the advantage of simulating the movement of Earth and Sun with reference to the parts surrounding the apparatus and corresponding to the star universe.

In a simpler embodiment of the apparatus, the movements of the globe and of the optical system are obtained independently of each other, by a manual drive of the time and calendar dials or drums.

According to an improved embodiments, the movements of the globe and of the optical system are associated and are controlled by a common drive operated by hand or by a clockwork.

My invention will be readily understood from a reading of the following disclosure reference being made to the accompanying drawings illustrating by way of example and by no means in a binding sense, two embodiments of my invention:

FIG. 1 is an elevational view partly as a half section through axis of the apparatus, the movements of the globe and of the optical system being driven independently by hand, FIG. 2 illustrates a detail of FIG. 1 in sectional view, FIG. 3 illustrates a further embodiment wherein the movements of the globe and of the optical system are controlled by a single drive operated by hand or by clockwork, FIG. 4 shows on an enlarged scale, a detail of FIG. 3.

The apparatus illustrated in FIG. 1 is provided with independent hand-operated drives and it includes a terrestrial globe 2 the lower end of which is rigid with a drum carrying an hour scale of hours and minutes, the uniformly distributed subdivisions 4 forming a scale of twenty four hours extending throughout the periphery of the drum.

The drum 3 may revolve through the agency of a ball bearing 5 over a sleeve 6 the lower section of which forms an outer ring 7 carrying a reference mark 8 or pointer cooperating with the hour scale and with the calendar scale described hereinafter. The sleeve 6 which is rigid furthermore with a toothed wheel 9 coaxial with the globe and calendar system revolves over a pedestal carrying the annual or calendar scale on a drum shaped section of said pedestal.

The calendar scale, the hour scale, the sleeve 6, the ring 7 are coaxial with reference to the globe 2 round the polar axis 12 of the latter.

The drum provided with the calendar scale 11 carries coaxially and rigidly therewith an upright 13 the upper end of which forms a support 14 for the optical system 15.

The optical system 15 which includes the source of light simulating the sun revolves with reference to the support 14 round an axis 16 defining the axis of the ecliptic and forming with the polar axis 12 an angle of 23°27'.

The optical system 15 is driven into rotation by the above-mentioned ring 7 and sleeve 6 in the same direction as the latter and with a speed relationship equal to 1/1 through the agency of the toothed wheel 9 and of the intermediate pinions and bevel wheels 17, 18 and 19. $d1$, $d2$, $d3$ and $d4$ defining the number of teeth on the wheels 9, 17, 18 and 19, the following relationship is to be observed $$d_1/d_2 = d_4/d_3$$

The optical system 15 includes a bulb 15a the punctual filament of which is located at the crossing point of the axes 12 and 16 at the center of the globe while an elliptic reflector 15b the axis of which is perpendicular to the axis 16 terminates with a flat edge lying in a plane containing the axis 16, which provides through the light produced by the bulb 15a a limitation between light and shade along a great circle of the globe 2 in last-mentioned plane.

The bulb 15a is located at one of the foci of the elliptic reflector 15b, the distance between the two foci of the reflector being equal to the radius of the globe 2.

In addition to the direct illumination of one-half of the globe by the bulb, there is provided along the axis of the reflector, a very luminous spot 21 indicating on the globe the position of the point where the Sun is at its zenith. Said spot may be replaced by a dark spot.

Electric energy may be fed to the bulb 15a through the agency of wires passing through the inside of the upright 13 on the drum 11 and of a commutator coaxial with the ecliptic axis 16.

The calendar scale 11 shows the days and months and also, if required, the symbols of the zodiac. Its periphery extending throughout the drum corresponds to one year, that is 365.2422 days and it is provided therefore with 366 subdivisions as illustrated at 22, of which 365 subdivisions define the 365 years of an ordinary year and the last subdivision equal to 2,422/10,000 of the preceding subdivision so as to provide for the 29th of February of a leap year.

The operation of the apparatus is as follows:

The reference mark 8 on the ring 7, shows simultaneously the time on the times scale 3 and the date on the calendar drum 11.

Examination of FIG. 1 shows immediately that, during 24 hours, the drum 3 executes with the globe 2 a complete revolution in an anticlockwise direction with reference to the sleeve 6, Earth executing thus one revolution round its polar axis with reference to the Sun whatever may be the position of the latter with reference to Earth. As the days progress, the ring 7 and sleeve 6 are caused to revolve anticlockwise with reference to the calendar scale 11 on its drum by an amount corresponding to the date given out by the scale subdivisions.

In one year, that is during one tropical year of 365, 2,422 days, the globe 2 executes 365.2422 revolutions with reference to the optical system 15, said revolutions corresponding to diurnal movement.

During this annual movement, the optical system 15 executes one revolution with reference to the stationary calendar dial and drives the globe 2 with it in said annual movement which is thus surperposed over the diurnal movement. Consequently, the globe 2 has actually executed 366.2422 revolutions with reference to the calendar drum 11, which ensures that both diurnal and annular movements of the Earth have been executed.

Obviously, when the apparatus is being assembled, the various component parts thereof should be adjusted, taking into account the astronomical data at the moment considered, with reference to the standard time at the point of use of the apparatus.

The irregularity of solar time with reference to standard time, is given out by the astronomical equation of time $E = R + C$ wherein R designates the reduction to equatorial conditions with a view to transferring onto the Equator the angular coordinates measured on the ecliptic forming with the Equator, an angle of 23°27′ while C is given out by the equation of centers so as to take into account the elliptic path of Earth during its annual movement round the Sun in accordance with the law of areas.

By reason of its execution, the optical system 15 of the apparatus revolves in the plane of the ecliptic so that the main parameter R of the equation of time is taken automatically into account.

It it possible to set aside the parameter C of the equation of centers since this leads to a maximum error of 2° which corresponds to 4 minutes in time. If, however, it is desired to take said parameter C into account, it is necessary to provide between the reference mark 8 and the optical system, a variable angular shifting of which the value is defined by the equation of centers C and consequently, it is possible to ensure with an excellent approximation, a lead by 2° of the optical system with reference to the reference mark 8 at the end of March, while a similar lag of 2° is obtained at the end of September and the optical system is in phase with the reference mark at the end of June and at the end of December.

Said result may be obtained in various manners and in particular by that illustrated in FIG. 2. In said figure, the reference mark 8 is shown as no longer rigid with the ring 7, but is provided on a lever 52 adapted to pivot with reference to the ring 7. Said lever is provided at its end directed inwardly and opposed to the reference mark 8 with a forked extension 53. The latter bears on either side of the eccentric hub 54, forming a cam rigid with the drum 11.

The arrangement which has just been described, forms one of the possible embodiments of an apparatus provided with separate hand-operated drives. If it is desired to obtain independent drives, while resorting to a clockwork for the control of the diurnal movement, the same general arrangement may serve with the addition of an electrically controlled clockwork carried by the sleeve 6 and fed through a commutator coaxially rigid with the upper end of the sleeve 6; said clockwork would then drive an inner series of teeth formed on the drum 3 so as to make the latter revolve with reference to the sleeve 6 in an anticlockwise direction at a uniform speed so as to execute one revolution in 24 hours. The apparatus forms thus a clock showing time on the hour scale and producing automatically the diurnal movement of the Earth.

The very slow movement of the sun has only a slight influence on the illumination of the earth from one day to the next so that it may remain under control of a manual drive ensuring the rotation of the optical system with reference to the calendar dial 11.

FIG. 3 illustrates an apparatus wherein the diurnal and annular movements are associated. The arrangement of the globe 2 and of the optical system 15 may remain the same as in the preceding case, for the apparatus illustrated in FIG. 1 wherein the two drives are independent.

The principle of the mechanism providing a combination of the two movements under manual or clockwork control, may be explained as follows:

The kinematic chain includes four basic movements as disclosed hereinafter with the operations and data corresponding to these several movements.

*Diurnal movement D*

Uniform rotation of one revolution in twenty-four hours corresponding to 365.2422 revolutions per year while the dial indicates standard time and may be associated with an indicator showing the days of the week and progressing at a speed D/7.

*Polar movement P*

This is a uniform rotation of one revolution in twenty-three hours, fifty-six minutes and four seconds corresponding to 366.2422 revolutions per year which defines the actual movement of the globe 2 and shows sidereal time together with an indication of the portion of the sky visible from a given point of the Earth.

Annual movement A

This corresponds to a uniform revolution of one revolution per year, that is in 366.2422 days and this is given out by the calendar scale which is suitably subdivided and may be associated with an indication of the year and with a further indicator of leap years.

Movement A'

This corresponds to a rotation of one revolution per year at a variable speed defined by the equation of centres. It is given out by the rotation of the optical system 15 and provides an indication of true solar time through the agency of hands and a dial driven simultaneously by the movements A' and P.

The drive of the whole arrangement together with the time scale or dial 24 may be obtained by hand through the crank 23a or else through the disconnectable driving clockwork 23b, by the movement D or P, that is respectively by means of a normal clock providing standard time and executing one revolution in twenty four hours or else by means of a sidereal clock executing one revoluution in twenty-three hours, fifty-six minutes and four seconds.

In the example described hereinafter, the first solution resorting to a normal clock is resorted to.

The four above movements D, C, A, and A' are furthermore associated so as to control the whole arrangement. This may be obtained in various manners, whether electrically or mechanically.

FIG. 3 illustrates a possible embodiment of mechanical gears ensuring the desired connections. The driving clock 24 provides standard time and drives the shaft 25 at a speed of one revolution in twenty four hours. The shaft 25 provides diurnal movement D. The shaft 26 illustrates the polar movement P and revolves at the speed of one revolution in twenty-three hours, fifty-six minutes and four seconds corresponding to 366.2422 revolutions per year and said shaft drives the globe 2 at the same speed through the agency of the toothed wheel 27, of the pinions 28 and 29 and of the wheel 31 provided with an inner series of teeth.

The shaft 32 carrying the calendar drum 33 illustrates the annual movement A and rotates consequently at a speed of one revolution per year.

Lastly, the shaft 34 controlling the optical system 15 revolves at a modulated speed illustrating the actual annual movement A'.

The relationship between the speeds of the shafts 26 and 32 should be equal to 366.2422. The movement of the shaft 26 is decomposed by a differential gear 35 into two movements P1 and P2 transmitted through the shaft 26a and 26b in a manner such that $P=P1+P2$. The shafts 26a and 32 are connected with a speed ratio equal to 366.24 through gears such as the couples of gears 36a/36b, 37a/37b, 38a/38b, 39a/39b and a speed reversing pinion 41, the speed ratios being $\frac{1}{3} \times \frac{1}{4} \times \frac{1}{7} \times \frac{1}{4.36}$. Said ratios may be obtained for instance by pinions the numbers of teeth on which are in the following relationship: 20/60, 15/60, 10/70, 25/109.

The shafts 32 and 26b are interconnected in a ratio equal to 0.0022 or 22/10,000 through the agency of gears 42a/42b, 43a/43b, 44a/44b, the speed ratios being $\frac{1}{10} \times \frac{1}{10} \times \frac{22}{100}$. These ratios may be obtained for instance with pinions the numbers of teeth of which are in ratios equal to 10/100, 10/100, 11/50.

The movement is transmitted towards the highest speed reducing ratios and it is readily apparent that the shaft 26 drives the shaft 26a and through the latter the shaft 32 so as to produce the movement A or annual movement. The shaft 32 drives the shaft 26b which provides 0.0022 revolution per year on the shaft 26. The connections obtained between the shafts 26, 26a, 26b and 32 provide consequently:

$P1=366.24$ revolutions per year,
$P2=0.0022$ revolution per year,
$P=366.2422$ revolutions per year,
$A=1$ The connection between the shafts 25, 26 and 32 is obtained by a differential gear 45 which ensures the relationship:

$$P=D+A=365.2422+1$$

It has been disclosed hereinabove that the optical system 15 is driven by the shaft 34. If it is not desired to take into account the equation of centres, it is sufficient to couple directly the shafts 34 and 32 to make them rotate in unison. In contradistinction, if it is desired to make the optical system 15 move in comformity with the true annual movement of Earth. It is necessary to resort to a coupling system such that the shaft 34 executes one revolution per year with a temporary lead and lag during the year with reference to the shaft 32 in accordance with the equation of centres.

In this case again, numerous solutions are possible. FIG. 4 refers to one of said solutions and illustrates on an enlarged scale, the coupling means between the shafts 32 and 34 of FIG. 2.

The shafts being in alignment, the shaft 32 carries at its end facing the shaft 34 a crank 46 facing a crank 47 of a different length secured to the cooperating end of the shaft 34.

The ends of the cranks 46 and 47 are interconnected by one arm of the bell crank 48 carrying a roller 49 at its other end. Said roller forms the cam-follower engaging the edge of a stationary cam disc 51 perpendicular to the shafts 34 and 32. Said cam 51 has an outline defined by the equation of centres so as to constrain the lever 48 to execute a movement which causes a phase-shifting between the cranks 46 and 47 in accordance with the equation of centres.

The drive, the execution and the arrangement of the different parts are readily provided by the builder by conventional mechanical and electrical means in accordance with the result desired as concerns cost price, accuracy, appearance, number of indications required and the like.

The simplest apparatus is that provided with independent hand-operated drives, possibly without any indication as to the position of the Sun at its zenith, whereas the complete scientific apparatus incorporates conjugated movements under manual and clockwork control with the incorporation of various indications which have a direct relationship with the different movements.

Obviously, my invention is not limited to the sole embodiment disclosed hereinabove by way of examples in a non-limiting sense and it covers in contradistinction all the modifications thereof falling within the scope of the accompanying claims.

What I claim is:

1. An apparatus simulating the varying illumination of Earth by the Sun, comprising a pedestal provided with a calendar scale extending over 360° round a vertical axis, a first annulus coaxial with the calendar scale and revolvable round said vertical axis and provided with a reference mark cooperating with the calendar scale, a terrestrial globe the polar axis of which coincides with said vertical axis, a second annulus coaxially rigid with the lower end of the globe adapted to revolve with the globe over the first annulus and provided with a coaxial hour scale cooperating with the reference mark on the latter, a reflector the axis of which extends through the center of the globe perpendicular to the ecliptic plane forming an angle of 23°27' with the equatorial plane of the globe, a punctual source of light rigid with the reflector to cooperate therewith and located at the center of the globe and means controlled by the rotation of the first annulus and controlling a rotation with a speed relationship of 1/1 of the reflector with reference to that of said first annulus round an axis lying in said ecliptic plane.

2. In an apparatus as claimed in claim 1, the provision of independent means controlling the rotation of the two annuli.

3. In an apparatus as claimed in claim 1, the provision of common control means for the rotation of both annuli with a speed relationship equal to the number of days in a year.

4. In an apparatus as claimed in claim 1, the provision of common control means for the rotation of both annuli with a speed relationship equal to the number of days in a year and means for adjusting automatically during each rotation of the first annulus last-mentioned speed relationship in accordance with the law governing the seasons of the Earth while retaining said relationship for the complete revolution considered as a whole.

5. In an apparatus as claimed in claim 1, the provision of common control means for the rotation of both annuli with a speed relationship equal to the number of days in a year, a lever pivotally secured to the first annulus round a vertical axis, carrying the reference mark of said annulus and including a forked extension enclosing the vertical axis of the calendar scale and a cam rigid with the calendar scale engaged by the forked extension and providing an automatic adjustment of the location of the reference mark and thereby a shifting of the hour subdivision registering with the reference mark during each revolution by amounts in accordance with variations in apparent solar time.

References Cited by the Examiner

UNITED STATES PATENTS

| | | | |
|---|---|---|---|
| 1,959,601 | 5/1934 | Schulse | 58—44 |
| 2,907,166 | 10/1959 | Baccara | 35—46 X |
| 3,014,287 | 12/1961 | Ernst | 35—47 |
| 3,197,893 | 8/1965 | Mariotti | 35—47 X |

FOREIGN PATENTS 242,641    10/1946    Switzerland.

JEROME SCHNALL, *Primary Examiner.*